Jan. 26, 1960  W. D. BROWN  2,922,836
GROMMET
Filed Feb. 20, 1956
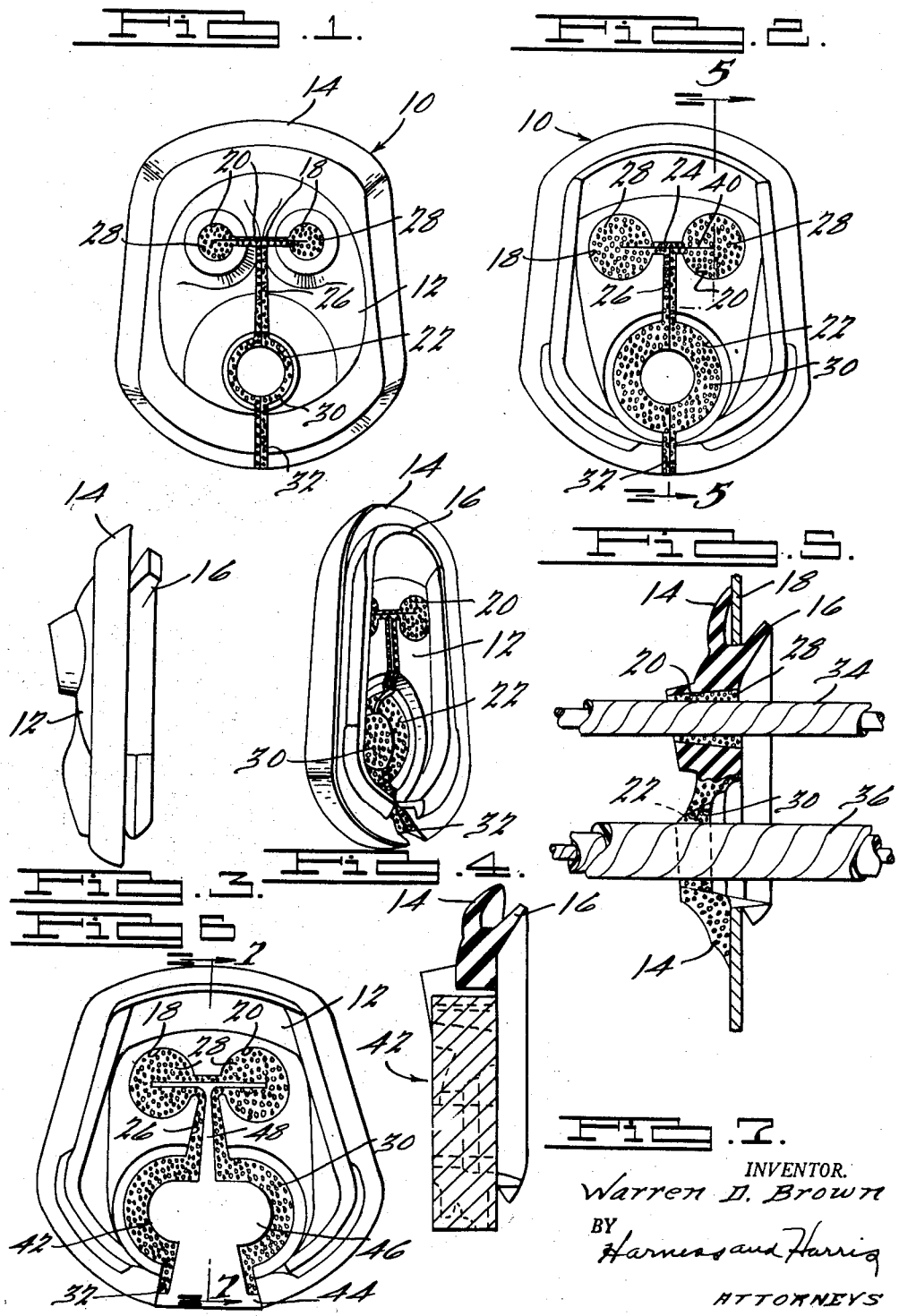
INVENTOR.
Warren D. Brown
BY
Harness and Harris
ATTORNEYS

United States Patent Office 2,922,836
Patented Jan. 26, 1960

2,922,836
GROMMET

Warren D. Brown, Detroit, Mich., assignor to Chrysler Corporation, Highland Park, Mich., a corporation of Delaware Application February 20, 1956, Serial No. 566,662

2 Claims. (Cl. 174—153)

My invention relates generally to grommets and has particular reference to an improved wiring harness grommet and the method of making the same.

Considerable trouble has been experienced in the manner of providing a seal where cables must pass through body sheet metal, particularly in the dash board area of a motor vehicle. Grommets which have used rubber alone, or rubber held in position by metal retainer means have been found difficult to install with the assurance of a good seal between the cable and the dash panel. Trouble has also been encountered by indifferent workmanship where it has been necessary to use several grommets of varying sizes.

A principal object of the invention is to provide an improved wiring harness grommet which provides greater sealing qualities compared to other grommets known in the art.

Another object of my invention is to provide an improved grommet which may sealingly receive one or more wiring harnesses as the case may be.

A further object of my invention is to provide an improved wiring harness grommet which in its application as a single unit to receive one or more wiring harnesses is more economical than others known in the art.

A further object is to provide an improved method of making my improved grommet.

Still a further object of my invention is to provide a wiring harness grommet which is particularly characterized by its ease of installation.

More particularly, my invention relates to a wiring harness grommet which is provided with one or more openings to receive wiring harness cables. The openings are either partially or completely filled with foam rubber so that a very tight seal may be had between the grommet and the cables. In the case where the opening is completely filled with foam rubber, it may be used or not used as the situation demands. If the opening is not used, the foam rubber seals the opening very well. If, for example, in some models of vehicles, additional cables have to be brought through the dash, the foam rubber in the opening may be pierced and the cable fed through without the loss of the seal.

Other objects and advantages will become more apparent from the following description of one embodiment of my invention, reference being had to the accompanying drawings in which:

Fig. 1 is a front elevational view of my improved grommet.

Fig. 2 is a rear elevational view of the grommet.

Fig. 3 is a side elevational view of the grommet.

Fig. 4 is a perspective view of the grommet.

Fig. 5 is a sectional view taken on the line 5—5 of Fig. 2 illustrating the grommet applied to a sheet metal panel with cables extending therethrough.

Fig. 6 is a rear elevational view of the grommet illustrating how the foam rubber is initially applied.

Fig. 7 is a sectional view taken on the line 7—7 of Fig. 6.

In the drawings, I have shown my improved grommet, generally indicated by the numeral 10, comprising a base portion 12 of a generally oval configuration. The base portion 12 is provided with a generally large outer lip 14 which surrounds the base portion 12 and a generally smaller inner lip 16, the latter cooperating with the lip 14 to secure the grommet 10 to a panel 18 as more clearly shown in Fig. 5. The base portion 12 as well as the integral lips 14 and 16 are preferably formed of hard rubber or one of the various forms of commercial synthetic rubber. The base portion 12 is provided with three openings to accommodate the reception of cables therethrough. Openings 18 and 20, which are of a generally conical shape, as more clearly shown in Fig. 5, are disposed in the upper half of the base portion 12 while a larger opening 22 is disposed in the lower half of the base portion 12. The opening 22 is also of a conical construction as seen in Fig. 5. The openings 18 and 20 are connected by channel 24 while the channel 24 is connected by channel 26 to the opening 22 in a general T type of configuration. The openings 18 and 20 as well as the channels 24 and 26 are completely filled with foam type material 28, preferably of rubber or synthetic rubber. In a similar fashion the opening 22 is lined with foam-like material 30. The base portion is also provided with a channel 32 which connects the opening 22 with the lower edge of the base portion and thereby completes a split from the lower edge of the base portion through the opening 22 up to and communicating with the openings 18 and 20. This split accommodates the spreading of the base portion, as illustrated in Fig. 6, so that the grommet may be applied to the cables 34 and 36 as shown in Fig. 5.

One of the salient features of my invention includes the use of a grommet for varying applications. For example, the grommet may be used on various automobiles of different styles where anywhere from one to three cables pass through the grommet. If, for example, the grommet is called upon to shield only one cable, the large opening 22 is the only opening in the grommet which is used and the foam rubber 30 which lines this opening forms a compact seal between the cable, as for example, the cable 36 in Fig. 5, and the walls of the opening 22 in the grommet. If, however, more than one cable is used, they may be placed in either opening 18 and 20, as, for example, cable 34 of Fig. 5, by merely inserting the cable through the openings. The foam rubber 28 in the openings 18 and 20 is split at 40 in a manner hereinafter set forth to accommodate any cables which may pass therethrough. The foam rubber 28 is so compressible that it may be easily compressed against the walls of the openings 18 and 20 to accommodate the reception of a cable therethrough. The compressed foam rubber, as more clearly shown in the adaptation in Fig. 5, when the cable is inserted through the openings 18 and 20, hugs the cables in a sealing manner. The openings 18 and 20 are completely filled with foam rubber to close off these openings from the passage of dirt or other foreign matter in the event they are not used.

In order to apply the foam rubber to the base portion, the base portion is split along the line formed by the channel 32, the opening 22 and channels 26 and 24 in the manner as set forth in Fig. 6 and placed over a core member generally indicated by the numeral 42. The core member 42 has a base 44 which engages the opposite walls of the channel 32 to hold the base portion 12 in its pried open position. The core member is also provided with a central bulbous portion 46 which has walls substantially parallel but spaced from the walls of the opening 22. The core member is also provided at its upper end with a T portion 48, the bottom part of which extends through the channel 26 while the upper part extends through the channel 24 and into both openings 18 and 20. The upper part of the T portion 48 therefore forms the split 40 in the foam rubber 28 disposed in the openings 18 and 20. The base portion 12 is first molded and then placed in a second mold with the core member 42 in position as shown in Fig. 6 and heretofore described. Thereafter foam rubber is poured between the sides of the opening 22, the channels 26 and 24 and into the openings 18 and 20. At this point, the foam rubber is cured to its final state and the completed grommet is removed from the core member 42. It will be noted that the channel 32 in the base member is partially filled with foam rubber during its application stage, as shown in Fig. 6, so that when the grommet is returned to its shape, as shown in Figs. 1 and 2, this foam rubber fills the channel 32 to effect a seal at that point. It should also be noted that during the curing process of the foam rubber, it becomes adhered to the walls of the openings 18, 20 and 22 as well as the channels 24, 26 and 32.

By employing my improved type of grommet, the openings which accommodate the passage of the cables are sealed by the foam rubber to prevent the passage of foreign matter through the openings. The compressibility and flexibility of the foam rubber also allows a variation in the angle at which the cables pass through the grommet while still maintaining an efficient seal.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. A composite grommet adapted to be disposed in an opening in a panel to receive one or more tubes extending therethrough comprising a flexible hard rubber base portion of substantial thickness having preformed means for detachable connection to a supporting member and having a plurality of spaced openings extending therethrough, an integral foam rubber sleeve lining the wall of one of said openings for substantially the full axial length thereof and of substantial thickness so as to provide a leakproof collar around the tube adapted to be passed through said one opening and an integral foam rubber plug filling another of the base portion openings for substantially the full axial length thereof adapted to be pierced by and to form a leakproof collar around the tube to be passed through said other opening.

2. A composite grommet adapted to be disposed in an opening in a panel to receive one or more tubes extending therethrough comprising a flexible hard rubber base portion of substantial thickness having preformed means for detachable connection to a supporting member and having a plurality of spaced openings extending therethrough, and interconnected by narrow slits, an integral foam rubber sleeve lining the wall of one of said openings for substantially the full axial length thereof and of substantial thickness so as to provide a leakproof collar around the tube adapted to be passed through said one opening and an integral foam rubber plug filling another of the base portion openings for substantially the full axial length thereof adapted to be pierced by and to form a leakproof collar around the tube to be passed through said other opening.

References Cited in the file of this patent

UNITED STATES PATENTS

| Number | Name | Date |
|---|---|---|
| 1,177,902 | Schweinert et al. | Apr. 4, 1916 |
| 1,697,814 | Forbes | Jan. 1, 1929 |
| 1,949,823 | Broecker | Mar. 6, 1934 |
| 2,291,430 | Ingersoll | July 28, 1942 |
| 2,440,015 | Meddick | Apr. 20, 1948 |
| 2,457,128 | Churnell | Dec. 28, 1948 |
| 2,707,723 | Moorehead | May 3, 1955 |
| 2,724,736 | Klumpp | Nov. 22, 1955 |